(12) United States Patent
Ni

(10) Patent No.: US 11,442,600 B2
(45) Date of Patent: Sep. 13, 2022

(54) SCREEN DISPLAY METHOD AND TERMINAL

(71) Applicant: Huawei Technologies Co., Ltd., Shenzhen (CN)

(72) Inventor: Jing Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/342,038

(22) PCT Filed: Oct. 14, 2016

(86) PCT No.: PCT/CN2016/102220
§ 371 (c)(1),
(2) Date: Apr. 15, 2019

(87) PCT Pub. No.: WO2018/068328
PCT Pub. Date: Apr. 19, 2018

(65) Prior Publication Data
US 2019/0250783 A1 Aug. 15, 2019

(51) Int. Cl.
G06F 3/0484 (2022.01)
G06F 3/04883 (2022.01)
G06F 3/0482 (2013.01)
G06F 3/04817 (2022.01)
G06F 3/0481 (2022.01)
H04M 1/72403 (2021.01)

(52) U.S. Cl.
CPC .......... *G06F 3/0484* (2013.01); *G06F 3/0481* (2013.01); *G06F 3/0482* (2013.01); *G06F 3/04817* (2013.01); *G06F 3/04883* (2013.01); *H04M 1/72403* (2021.01)

(58) Field of Classification Search
CPC ................... G06F 2203/04808; G06F 3/04817
See application file for complete search history.

(56) References Cited

U.S. PATENT DOCUMENTS 7,697,729 B2 4/2010 Howell et al.
8,165,355 B2 4/2012 Benkley et al.
(Continued)

FOREIGN PATENT DOCUMENTS

CN 1997957 A 7/2007
CN 102594980 A 7/2012
(Continued)

OTHER PUBLICATIONS

Machine Translation and Abstract of Chinese Publication No. CN102855051, Jan. 2, 2013, 15 pages.
(Continued)

*Primary Examiner* — Rayeez R Chowdhury
(74) *Attorney, Agent, or Firm* — Conley Rose, P.C.

(57) ABSTRACT

Embodiments includes a screen display method and a terminal. The method includes a terminal displaying a first screen, detecting a first triggering event, responding to the first triggering event, and displaying a shortcut window on the first screen. The shortcut window includes at least one object. Each object is associated with one element. The method further includes displaying a screen of an element associated with the at least one object after detecting that the at least one object in the shortcut window is selected.

20 Claims, 8 Drawing Sheets

(56) References Cited

U.S. PATENT DOCUMENTS

| | | | |
|---|---|---|---|
| 8,229,184 B2 | 7/2012 | Benkley et al. | |
| 8,278,946 B2 | 10/2012 | Thompson et al. | |
| 8,279,182 B2 | 10/2012 | Kim et al. | |
| 8,315,444 B2 | 11/2012 | Gardner | |
| 8,358,815 B2 | 1/2013 | Benkley et al. | |
| 8,443,199 B2 | 5/2013 | Kim et al. | |
| 8,693,736 B2 | 4/2014 | Benkley et al. | |
| 9,201,539 B2 | 12/2015 | Hinckley et al. | |
| 2008/0042983 A1 | 2/2008 | Kim et al. | |
| 2009/0058821 A1* | 3/2009 | Chaudhri | G06F 3/0486 345/173 |
| 2009/0083847 A1 | 3/2009 | Fadell et al. | |
| 2009/0083850 A1 | 3/2009 | Fadell et al. | |
| 2009/0158193 A1* | 6/2009 | Chaudhri | G06F 3/0484 715/779 |
| 2010/0240415 A1* | 9/2010 | Kim | G06F 21/36 455/565 |
| 2011/0252350 A1* | 10/2011 | Chaudhri | G06F 9/451 715/769 |
| 2011/0252369 A1* | 10/2011 | Chaudhri | G06F 3/04842 715/830 |
| 2012/0154296 A1 | 6/2012 | Hinckley et al. | |
| 2013/0082945 A1 | 4/2013 | Jo | |
| 2014/0068518 A1 | 3/2014 | Liu et al. | |
| 2014/0109024 A1 | 4/2014 | Miyazaki | |
| 2014/0181962 A1* | 6/2014 | Seo | G06F 21/629 726/19 |
| 2014/0292670 A1 | 10/2014 | Cho | |
| 2014/0317555 A1* | 10/2014 | Choi | G06F 3/0482 715/781 |
| 2014/0351748 A1 | 11/2014 | Xia et al. | |
| 2015/0047017 A1 | 2/2015 | Kim et al. | |
| 2015/0205456 A1 | 7/2015 | Ji et al. | |
| 2015/0339052 A1 | 11/2015 | Yuan et al. | |
| 2016/0041719 A1 | 2/2016 | Wang et al. | |
| 2016/0062515 A1* | 3/2016 | Bae | G06F 3/0414 345/174 |
| 2016/0283090 A1* | 9/2016 | Seo | H04B 1/40 |
| 2018/0373427 A1 | 12/2018 | Wang et al. | |
| 2019/0012071 A1 | 1/2019 | Wang et al. | |

FOREIGN PATENT DOCUMENTS

| | | |
|---|---|---|
| CN | 102855051 A | 1/2013 |
| CN | 103516907 A | 1/2014 |
| CN | 103530047 A | 1/2014 |
| CN | 103870119 A | 6/2014 |
| CN | 103914148 A | 7/2014 |
| CN | 103927114 A | 7/2014 |
| CN | 104049867 A | 9/2014 |
| CN | 104077518 A | 10/2014 |
| CN | 104298417 A | 1/2015 |
| CN | 104346063 A | 2/2015 |
| CN | 104572175 A | 4/2015 |
| CN | 104598134 A | 5/2015 |
| CN | 104850433 A | 8/2015 |
| CN | 105094331 A | 11/2015 |
| CN | 105204710 A | 12/2015 |
| CN | 105335041 A | 2/2016 |
| CN | 105511781 A | 4/2016 |
| CN | 105573639 A | 5/2016 |
| CN | 105677231 A | 6/2016 |
| CN | 105867728 A | 8/2016 |
| EP | 2824560 A1 | 1/2015 |
| EP | 3521988 A1 | 7/2019 |
| JP | 2004287702 A | 10/2004 |
| JP | 2007272650 A | 10/2007 |
| JP | 2008009835 A | 1/2008 |
| JP | 2013025357 A | 2/2013 |
| JP | 2013140440 A | 7/2013 |
| JP | 2014157578 A | 8/2014 |
| JP | 2015520465 A | 7/2015 |
| JP | 2015167022 A | 9/2015 |
| KR | 20080000481 A | 1/2008 |
| KR | 20110101683 A | 9/2011 |
| KR | 20130036679 A | 4/2013 |
| KR | 20140019531 A | 2/2014 |
| KR | 20150018256 A | 2/2015 |
| KR | 101552116 B1 | 9/2015 |
| KR | 20160009428 A | 1/2016 |

OTHER PUBLICATIONS

Machine Translation and Abstract of Chinese Publication No. CN104298417, Jan. 21, 2015, 39 pages.

Foreign Communication From A Counterpart Application, Chinese Application No. 201680080568.6, Chinese Office Action dated Dec. 31, 2019, 8 pages.

Foreign Communication From A Counterpad Application, European U.S. Appl. No. 16/918,926 3, Extended European Search Report dated Aug. 23, 2019, 10 pages.

Machine Translation and Abstract of Chinese Publication No. CN103870119, Jun. 18, 2014, 25 pages.

Machine Translation and Abstract of Chinese Publication No. CN103927114, Jul. 16, 2014, 15 pages.

Machine Translation and Abstract of Chinese Publication No. CN104049867, Sep. 17, 2014, 20 pages.

Foreign Communication From A Counterpart Application, PCT Application No. PCT/CN2016/102220, English Translation of International Search Report dated Jul. 12, 2017, 2 pages.

Foreign Communication From A Counterpart Application, PCT Application No. PCT/CN2016/102220, English Translation of Written Opinion dated Jul. 12, 2017, 5 pages.

Gao, M., "Fingerprint sensors in mobile devices." In Industrial Electronics and Applications (ICIEA), 2014 IEEE 9th Conference on, 2014, pp. 1437-1440.

Bromba Biometrics, "Fingerprint Cellphone", Bromba GmbH,dated Jan. 26, 2011, 3 pages.

Kris Carlon, "Huawei Ascend Mate 7 review: the best finger scanner on Android," online, URL, https://www.androidpit.com/huawei-ascend-mate-7-review, Sep. 10, 2014, 18 pages.

Huang Yujian et al., "The Bible of Project Development Paradigm in Android," China Railway Press, Aug. 2012, 6 pages.

Tech2touch: "Switch between Apps in Xiaomi Redme 1 S," Sep. 12, 2014, XP055920331, 2 pages.

Xiaomi India: "MIUI Tip—Recent Apps View," Jun. 3, 2015, XP055920332, 1 page.

* cited by examiner

SCREEN DISPLAY METHOD AND TERMINAL

CROSS-REFERENCE TO RELATED APPLICATIONS

This application is a U.S. National Stage of International Patent Application No. PCT/CN2016/102220 filed on Oct. 14, 2016, which is hereby incorporated by reference in its entirety.

TECHNICAL FIELD

The present invention relates to the field of electronic product applications, and in particular, to a screen display method and a terminal.

BACKGROUND

With development of mobile Internet and intelligent terminals, such as a smart phone and a tablet computer, a large quantity of application software for installation on an intelligent terminal emerge, thereby bringing convenience to people' life.

A user may usually install a plurality of applications on a terminal according to an actual requirement of the user. When a screen displayed on a desktop of the terminal is a screen of a game application, if the user needs to enter another application, for example, WeChat, the user needs to quit the screen of the game application, return to the desktop, and find the WeChat application in applications displayed on the desktop. Then the user selects an icon of the WeChat application. When detecting that the icon of the WeChat application is selected, the terminal enters the WeChat application. Alternatively, when a screen displayed on the desktop of the terminal is the screen of the game application, and the WeChat application that the user needs to enter runs in background, as shown in FIG. 1, through triggering by the user, the terminal may display, on a display screen and in a row, a plurality of screens of applications that run in background. If the first screen is the screen of the game application, and the second screen is a screen of the WeChat application that runs in background, the user needs to flick rightward on the display screen, move the second screen to a location of the first screen, and then tap the second screen, so as to display in a full screen the second screen, thereby implementing switching from the current screen of the game application to the screen of the WeChat application.

In addition, in the prior art, when the screen displayed on the terminal is a screen of an application or another screen (which does not include the desktop), if the user needs to open a file (such as a music or an office document) or check a reminder, the user needs to perform an operation on the terminal to return to the desktop, and then finds the file or the reminder that needs to be opened. Then the user performs a corresponding operation on the file or the reminder to open a screen of the file or the reminder.

In conclusion, in the prior art, when the screen displayed by the user on the terminal is not the desktop, a switching manner from the current screen to a screen of another content (such as an application, a file, or a reminder) is relatively complex.

SUMMARY

The present invention provides a screen display method and a terminal, so as to resolve a prior-art problem that when a screen displayed on a terminal is not a desktop, a manner in which a user switches from a current screen to a screen of other content is relatively complex.

According to a first aspect, a screen display method is provided, including:

when displaying a first screen, detecting, by a terminal, a first triggering event, and responding to the first triggering event to display a shortcut window on the first screen, where the shortcut window includes at least one object, each object is associated with one element, and elements associated with the at least one object include one or more of an application installed on the terminal, contacts, settings, a reminder, or a document; and after detecting that at least one object in the shortcut window is selected, displaying, by the terminal, a screen of an element associated with the selected object. In the embodiments of the present invention, the shortcut window can be displayed on the first screen, the shortcut window includes at least one object, a screen of an element can be directly entered by selecting the object of the shortcut window, and the element may be one or more of an application installed on the terminal, contacts, settings, a reminder, or a document. Therefore, a manner of quickly entering from the first screen to a screen of another element is provided. When an element associated with the object in the shortcut window is an application installed on the terminal, such as WeChat or a browser, the user may directly enter the screen of the another application by directly invoking the shortcut window on the first screen and by using the object in the shortcut window. Compared with the prior art, this simplifies the manner of entering from the first screen to the screen of the another application, thereby improving user experience.

Preferably, the application that is associated with the object included in the shortcut window and that is installed on the terminal is an application that the user usually uses, and it is convenient for the user to directly enter, by using the object included in the shortcut window, the application that the user usually uses, thereby improving user experience.

It should be noted that in this embodiment of the present invention, the first screen may be a desktop, or may be a screen of an application. In addition, when the first screen is a desktop, it may be avoided to find, from a relatively large quantity of applications on the desktop, an application that the user needs to open. This improves user experience.

On the basis of the first aspect, optionally, when the first screen is a screen of a first application, the user may quickly switch from the first screen to a screen of another element by using the shortcut window. This avoids a prior-art problem that when the user quickly switches from a screen of one application to a screen of another application on the terminal, the applications are limited to applications running in background.

On the basis of the first aspect, an embodiment of the present invention further provides a manner in which an object is manually added to the shortcut window:

when displaying the first screen, detecting, by the terminal, a second triggering event, responding to the second triggering event, and setting a first object into the shortcut window, where the second triggering event is used to trigger setting of the first object into the shortcut window, and the first object is associated with the first application.

The user can add an object to the shortcut window according to a requirement of the user, and therefore, this can belter meet a requirement of the user, and improve user experience.

A quantity of applications in the shortcut window should not be excessively large, so that the user can quickly find, in the shortcut window, an object associated with an application that needs to be started. Specifically, the terminal deletes, from the shortcut window, n objects in the at least one object at a preset time interval, where n is a positive integer that is greater than 0 and that is not greater than a total quantity of objects included in the at least one object.

The n objects that are deleted by the terminal from the shortcut window meet a preset condition. For example, a quantity of times of using an application associated with the n objects is less than a preset threshold in a next time period. For example, the preset threshold is set to 1, and it is assumed that an object associated with the WeChat application is currently set into the shortcut window. However, a quantity of times of using the WeChat application by the user in two hours from a current moment is less than 1. That is, the user may not start the WeChat application in this time period. Therefore, the terminal may delete the object associated with the WeChat application in this time period, so as to avoid that a quantity of objects in the shortcut window is excessively large, which degrades user experience.

On the basis of the first aspect, optionally, when the element associated with the object is an application installed on the terminal, the object is an icon of the application or a screenshot of a screen that is scaled down according to a preset percentage, that is of the application, and that is finally displayed on the terminal The object is the icon or the screenshot, and therefore, the object can be clearly identified by the user.

In addition, when elements associated with the object are a reminder, contacts, settings, and a document, the objects may be directly the reminder, the contacts, the setting, and the document. For example, when the document is a music file, the object is the music file, or the objects are icons of the reminder, the contacts, the setting, and the document.

On the basis of the first aspect, optionally, an embodiment of the present invention further provides a manner in which an object is automatically added to the shortcut window:

when determining that a feature of at least one element installed on the terminal is in accordance with a preset feature, setting, by the terminal, an object associated with the at least one element into the shortcut window.

The terminal can automatically set the object associated with the element that is in accordance with the preset feature into the shortcut window, which reduces an active operation of the user, and brings convenience to the user.

On the basis of the first aspect, optionally, after the displaying, by the terminal, the shortcut window, detecting a third triggering event and responding to the third triggering event, so as to adjust a size of the shortcut window, where the third triggering event is used to adjust the size of the shortcut window.

When the terminal displays the shortcut window, the size of the shortcut window can be adjusted so that more objects can be displayed in the shortcut window, thereby enabling the user to easily check an object. In the first aspect, the size of the shortcut window can be adjusted so that fever objects can be displayed in the shortcut window, thereby reducing impact of the shortcut window on user in checking the first screen, and improving user experience.

In addition, it should be noted that in this embodiment of the present invention, the user may further adjust a display location of the shortcut window on the terminal.

On the basis of the first aspect, optionally, when a quantity of objects included in the shortcut window is greater than a quantity of objects displayed in the shortcut window, detecting, by the terminal, a flicking operation in a display area of the shortcut window; and responding to the flicking operation, switching between at least one object displayed in the shorten window, and determining that objects displayed in the shortcut window include the at least one selected object.

A size of the display area of the shortcut window is limited, and therefore, when a quantity of objects included in the shortcut window is relatively large, it is easy to cause abnormal display when all the objects are displayed in the shortcut window, and it is difficult for the user to find an object. However, when some objects are displayed in the shortcut window, the objects displayed in the shortcut window are switched through a flicking operation, thereby enabling the user to easily find an object that needs to be selected, and improving user experience.

According to a second aspect, a screen display terminal is provided, and the terminal includes a display unit and a processing unit, where the display unit is configured to display a first screen; and the processing unit is Configured to: when detecting a first triggering event, trigger the display unit to respond to the first triggering event, where the first triggering event is used to trigger the display unit to display a shortcut window on the first screen; the display unit is further configured to: respond to the first triggering event, and display the shortcut window on the first screen, where the shortcut window includes at least one object, each object is associated with one element, and elements associated with the at least one object include at least two of an application installed on the terminal, contacts, settings, a reminder, or a document; and the processing unit is further configured to: after detecting that at least one object in the shortcut window is selected, trigger the display unit to display a screen of an element associated with the selected object.

On the basis of the second aspect, optionally, the first screen is a screen of a first application.

On the basis of the second aspect, optionally, the processing unit is further configured to: when displaying the first screen, detect, by the display unit, a second triggering event and respond to the second triggering event, where the second triggering event is used to trigger setting of an object associated with the first application into the shortcut window.

On the basis of the second aspect, optionally, the processing unit is further configured to: delete, from the shortcut window, n objects in the at least one object at a preset time interval, where n is a positive integer dial is greater than 0 and that is not greater than a total quantity of objects included in the at least one object.

On the basis of the second aspect, optionally, the object is an icon of the application or a screenshot of a screen that is scaled down according to a preset percentage, that is of the application, and that is finally displayed on the terminal.

On the basis of the second aspect, optionally, the processing unit is further configured to: after determining that a feature of at least one application installed on the terminal is in accordance with a preset feature, set an object associated with the at least one application into the shortcut window.

On the basis of the second aspect, optionally, the processing unit is further configured to: after the display unit displays the shortcut window, detect a third triggering event, where the third triggering event is used to adjust a size of the shortcut window; and respond to the third triggering event, and adjust the size of the shortcut window.

On the basis of the second aspect, optionally, when a quantity of objects included in the shortcut window is greater than a quantity of objects displayed in the shortcut window, the processing unit is further configured to: before detecting that the at least one object in the shortcut window is selected, detect a flicking operation in a display area of the shortcut window; and respond to the flicking operation, switch between at least one object displayed in the shortcut window, and determine that objects displayed in the shortcut window include the at least one selected object.

According to a third aspect, an embodiment of the present invention further provides a terminal device, and the terminal device includes a processor and a memory, where the memory is configured to store a software program, and the processor is configured to read the software program stored in the memory and implement the method provided in the first aspect or am implementation of the first aspect.

According to a fourth aspect, an embodiment of the present invention further provides a computer storage medium, where the storage medium may be nonvolatile, that is, content in the storage medium is not lost in case of a power failure. The storage medium stores a software program, and when the software program is read and performed by one or more processors, the method provided in the first aspect or any implementation of the first aspect may be implemented.

DESCRIPTION OF EMBODIMENTS

To make the objectives, technical solutions, and advantages of the present invention clearer, the following further describes the present invention in detail with reference to the accompanying drawings.

It should be understood that a screen display method in the embodiments of the present invention is mainly applied to a terminal. The terminal may also be referred to as UE (User Equipment, user equipment), an MS (Mobile Station, mobile station), a mobile terminal (Mobile Terminal), and the like. Optionally, the terminal may be a mobile phone, a tablet computer, a PDA (Personal Digital Assistant, personal digital assistant), a POS (Point of Sales, point of sales), a vehicle-mounted computer, a set top box, or the like.

According to the screen display method in the embodiments of the present invention, a shortcut window can be displaced on a first screen, the shortcut window includes at least one object, a screen of an element can be directly entered by selecting the object of the shortcut window, and the element may be one or more of an application installed on the terminal, contacts, settings, a reminder, or a document. Therefore, a manner of entering from the first screen to a screen of another element is provided. When an element associated with the object in the shortcut window Is an application installed on the terminal, such as WeChat or a browser, the user may directly enter the screen of the another application by directly invoking the shortcut window on the first screen and by using the object in the shortcut window. Compared with the prior art, this simplifies the manner of entering from the first screen to the screen of the another application, thereby improving user experience.

Preferably, the application that is associated with the object included in the shortcut window and that is installed on the terminal is an application that the user usually uses.

It should be noted that the element associated with the object in the shortcut window may run in background or may not run in background. For example, when the element associated with the object in the shortcut window is an application, the application may run in background or may not run in background. The application associated with the object in the shortcut window is an application installed on the terminal.

Figure 1:
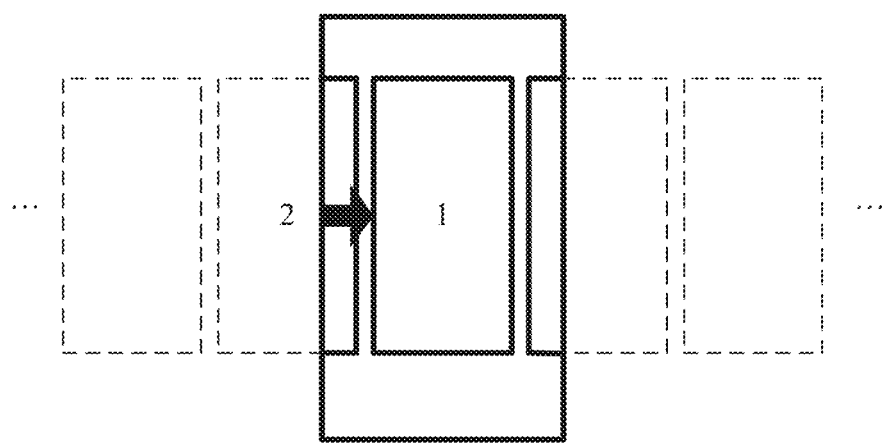
FIG. 1 is a schematic diagram of displaying screens of a plurality of applications running in background in the prior art.
Figure 2:
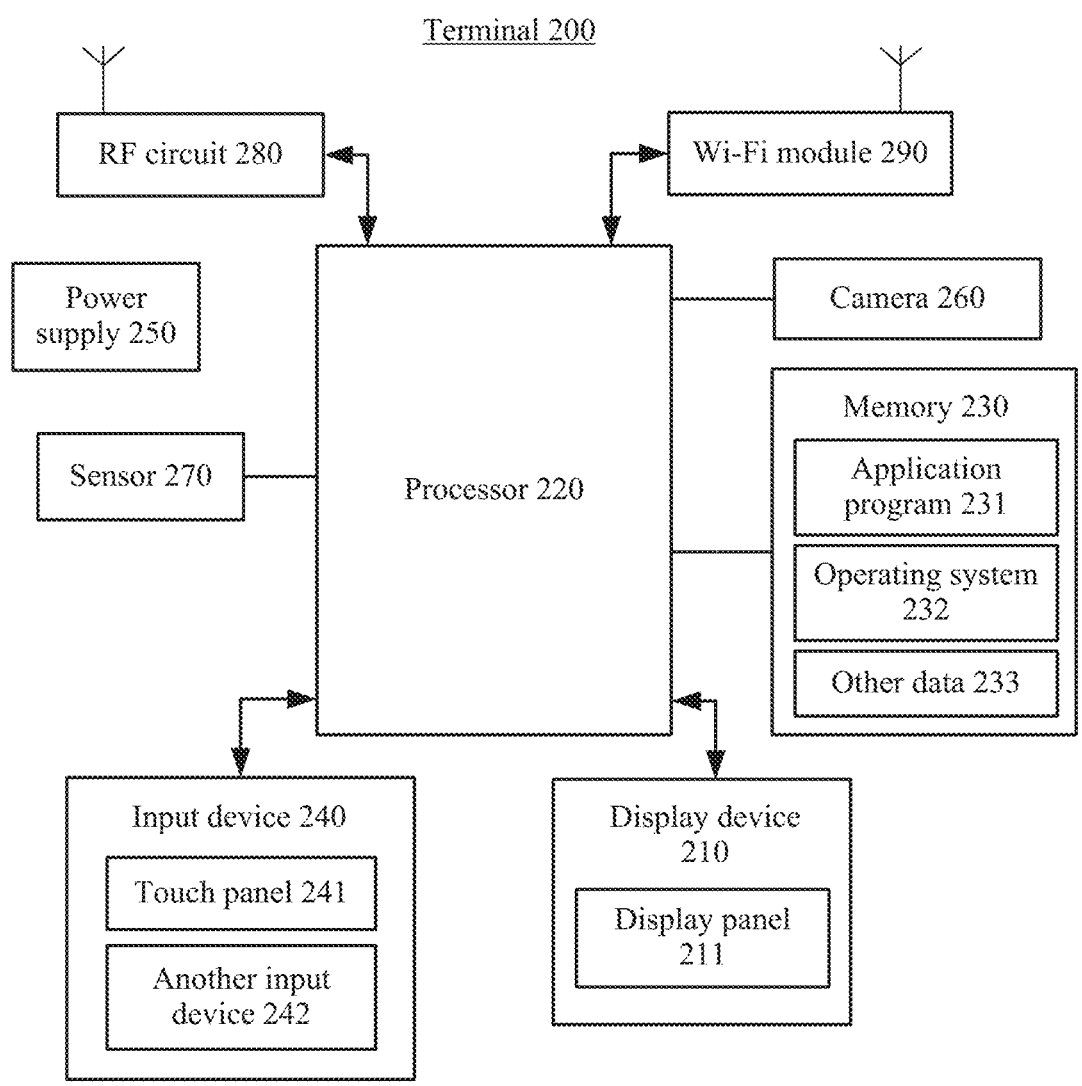
FIG. 2 is a schematic diagram of a hardware structure of a terminal according to an embodiment of the present invention.

It should be noted that elements associated with objects displayed in the shortcut window may be of a same type, for example, the elements are all applications, or may be a mix of different types, for example, a mix of applications and pictures. Referring to FIG. 2, FIG. 2 is a schematic diagram of a hardware structure of a terminal to which an embodiment of the present invention is applied. A terminal 200 includes a display device 210, a processor 220, and a memory 230. The display device 210 includes a display panel 211, which is configured to display information that is input by a user or information provided for the user, various operation screens of the terminal 200, and the like. In this embodiment of the present invention, the display panel 211 is mainly configured to display a screen, a desktop, and a shortcut window of an application installed on the terminal 100, at least one object included in the shortcut window, and the like. Optionally, the display panel 211 may be configured in a form such as an LCD (Liquid Crystal Display, liquid crystal display) or an OLED (Organic Light-Emitting Diode, organic light-emitting diode).

The processor 220 is configured to read a computer program, and perform a method defined by the computer program. For example, the processor 220 reads one or more application programs, so as to run the application on the terminal 100, and display a screen of the application on the display device 210. The processor 220 may include one or more general purpose processors, and may further include one or more DSPs (Digital Signal Processor, digital signal processor), which are configured to perform corresponding operations, so as to implement the technical solutions provided in this embodiment of the present invention.

The memory 230 usually includes an internal memory and an external memory. The internal memory max be a random access memory (RAM), a read-only memory (ROM), a cache (CACHE), or the like The external memory may be a hard disk, an optical disc, a USB flash drive, a floppy disk, a tape drive, or the like. The memory 230 is configured to store the computer program and other data 233. The computer program includes an operating system 232 and an application program 231. The other data 233 may include the operating system 232 or data obtained after the application program 231 is operated. The data includes system data (for example, a configuration parameter of the operating system) and user data, for example, a picture taken by the user is typical user data. In this embodiment of the present invention, the shortcut window, the at least one object included in the shortcut window, and the element associated with the object included in the shortcut window are stored in the memory 230. When the terminal 200 does not detect the first triggering event, the shortcut window is not displayed on the first screen. Only when detecting the first triggering event, the terminal 200 invokes, from the memory 230, the shortcut window and the at least one object included in the shortcut window, and displays the shortcut window and the at least one object included in the shortcut window on the display device 210.

In addition, the terminal 200 may further include an input device 240, which is configured to receive digital information, feature information, or a contact touch operation, non-contact gesture that are input, generate signal input related to user configuration and function control of the terminal 200, and the like. Specifically, in this embodiment of the present invention, the input device 240 may include a touch panel 241. The touch panel 241, also referred to as a touchscreen, can collect a touch operation of the user on or near the touch panel 241 (for example, an operation of the user on the touch panel 241 or near the touch panel 241 by using any proper object or accessory, such as a finger or a stylus), and can drive a corresponding connection apparatus according to a preset program. Optionally, the touch panel 241 may include two parts: a touch detection apparatus and a touch controller. The touch detection apparatus detects a touch position of the user, detects a signal generated by a touch operation, and transfers the signal to the touch controller. The touch controller receives touch information from the touch detection apparatus, converts the touch information into touch point coordinates, and then sends the touch point coordinates to the processor 220, and can receive and execute a command sent by the processor 220. In this embodiment of the present invention, if the first triggering event is a first gesture, the touch detection apparatus in the touch panel 241 detects the touch operation, and sends a signal corresponding to the detected touch operation to the touch controller. The touch controller converts the signal into touch point coordinates, and sends the touch point coordinates to the processor 220. The processor 220 determines the touch operation as the first gesture according to the received touch point coordinates, and responds to the first gesture. Specifically, the shortcut window and the at least one object included in the shortcut window are invoked from the memory 230, and the shortcut window and the at least one object included in the shortcut window are displayed on the display device 210.

The touch panel 241 may be implemented as a plurality of types, such as a resistive type, a capacitive type, an infrared ray, and a surface acoustic wave. It should be understood that in this embodiment of the present invention, the touch panel 241 may cover the display panel 211, so as to form a touch display screen. In addition to the touch panel 241, the input unit 240 may further include another input device 242, where the another input device 242 may include but is not limited to one or more of a physical keyboard, a functional key (such as a volume control key or an on/off key), a trackball, a mouse, or an operating rod. Therefore, in this embodiment of the present invention, the first triggering event is not limited to the first gesture, and may further be a physical button and the like.

In addition, the terminal 200 may further include a power supply 250 that is configured to supply power to other modules and a camera 260 that is configured to take a picture or record a video. The terminal 200 may further include one or more sensors 270, such as an acceleration sensor, an optical sensor, and a pressure sensor. Therefore, in this embodiment of the present invention, the first triggering event may further be that the terminal 200 detects a pressure in a specific region of the display device 210 and the like. Specifically, the terminal 200 may further include a radio frequency (Radio Frequency, RF) circuit 280, which is configured to perform network communication with a wireless network device, and may further include a Wi-Fi module 290, which is configured to perform Wi-Fi communication with another device.

Although not shown in the diagram, the terminal 200 may further include a camera flash and the like. Details are not described herein again.

Figure 3:
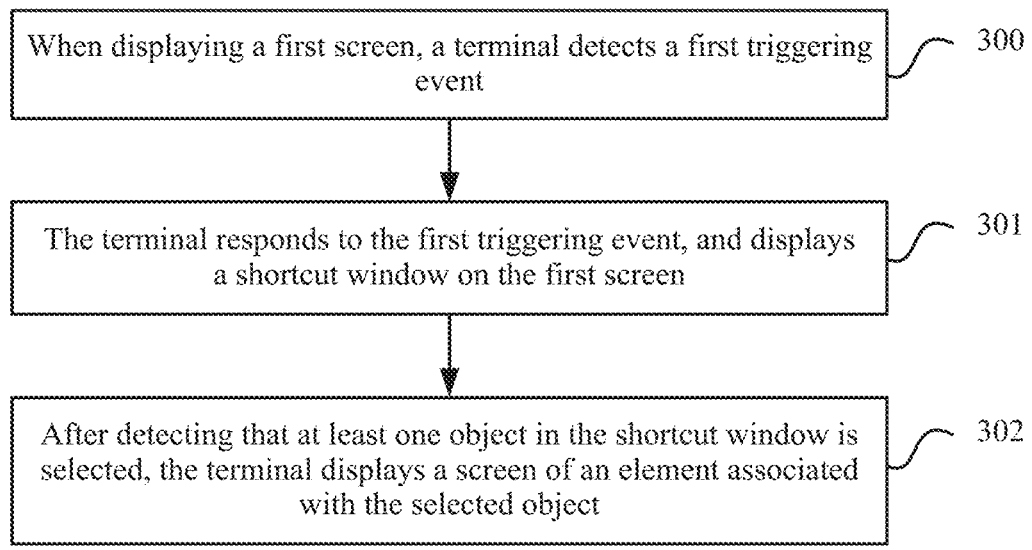
FIG. 3 is a schematic flowchart of a screen display method according to an embodiment of the present invention.

Specifically, as shown in FIG. 3, a screen display method according to an embodiment of the present invention includes the following steps.

Step 300: When displaying a first screen, a terminal detects a first triggering event, where the first triggering event is used to trigger displaying of a shortcut window on the first screen.

In step 300, the first screen may be a desktop, may be a screen of an application, or may be a screen of a file (for example, a screen of a word document). The first triggering event may be a specific touch gesture (for example, a swipe with three fingers) in a display area, a specific sound, a pressure-sensitive operation in a specific region of the display area, selecting a specific physical button, identifying a specific fingerprint, identifying floating touch by using an infrared ray or an ultrasonic wave, a pressure screen, or the like.

When the first triggering event is the specific touch gesture on the display area, a user may define a touch gesture in the terminal according to a requirement. When the first triggering event is the specific sound, the user may define a sound in the terminal according to a requirement.

Step 301: The terminal responds to the first triggering event, and displays the shortcut window on the first screen, where the shortcut window includes at least one object, each object is associated with one element, and elements associated with the at least one object include at least two of an application installed on the terminal, contacts, settings, a reminder, or a document.

In addition, an element associated with the object included in the shortcut window may further be only one of an application installed on the terminal, contacts, settings, a reminder, or a document.

It should be noted that in this embodiment of the present invention, when the element associated with the object is an application installed on the terminal, the object is an icon of the element or a screenshot of a screen that is scaled down according to a preset percentage, that is of the element, and that is finally displayed on the terminal. For example, when the element is WeChat installed on the terminal, the object may be an icon of the WeChat or a screenshot of a screen that is scaled down according to a preset percentage, that is of the WeChat, and that is finally displayed on the terminal. If the screen finally displayed on a display screen is a dynamic screen, the screenshot may be a dynamic screenshot, or may be a static screenshot.

In addition, the object may further be a music file, a document, or the like.

When a relatively large quantity of applications are installed on the terminal and a relatively large quantity of documents are stored in the terminal, a quantity of icons that are of the applications and that are displayed on the terminal is relatively large, which is not convenient for the user to find an icon. An object of an application or an object of a document that the user usually uses may be set into the shortcut window. The user may invoke the shortcut window by using the first triggering event. Compared with the icons on a desktop of the terminal, a quantity of objects included in the shortcut window is relatively small. Therefore, it is convenient for the user to quickly find an icon, thereby further improving user experience.

Specifically, that swiping with three fingers to trigger the first screen to display the shortcut window is used as an example. Before the terminal responds to the first triggering event, the shortcut window is not displayed on the first screen. A quantity of objects included in the shortcut window may be greater than a quantity of objects that can be displayed in the shortcut window. Therefore, optionally, when the quantity of objects included in the shortcut window is greater than the quantity of objects displayed in the shortcut window, the terminal detects a flicking operation in a display area of the shortcut window, then responds to the flicking operation, switches between at least one object displayed in the shortcut window, and determines that objects displayed in the shortcut window include at least one selected object.

Figure 4A:
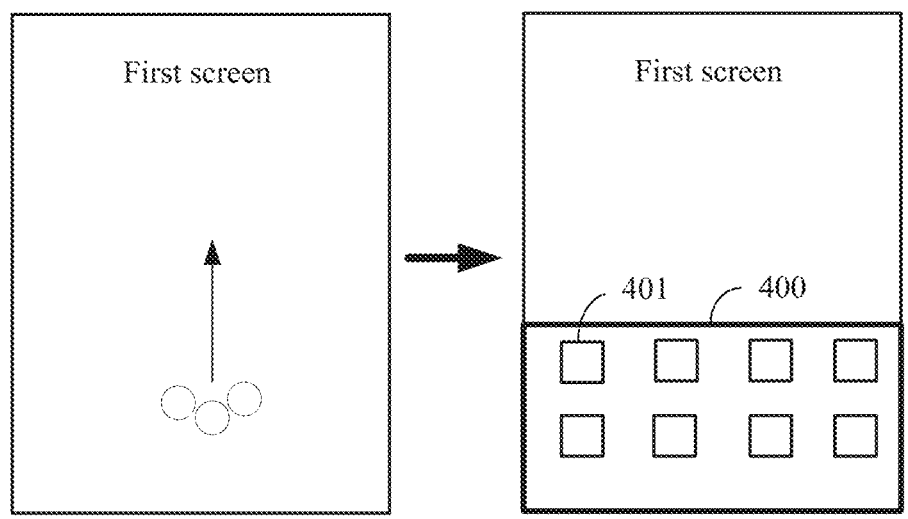
FIG. 4a-FIG. 4i are respectively schematic diagrams of a shortcut window according to an embodiment of the present invention.
Figure 4B:
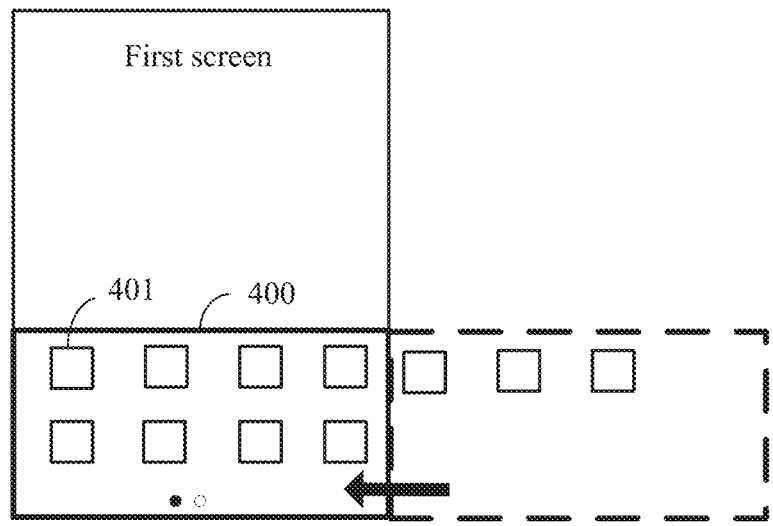
Figure 4C:
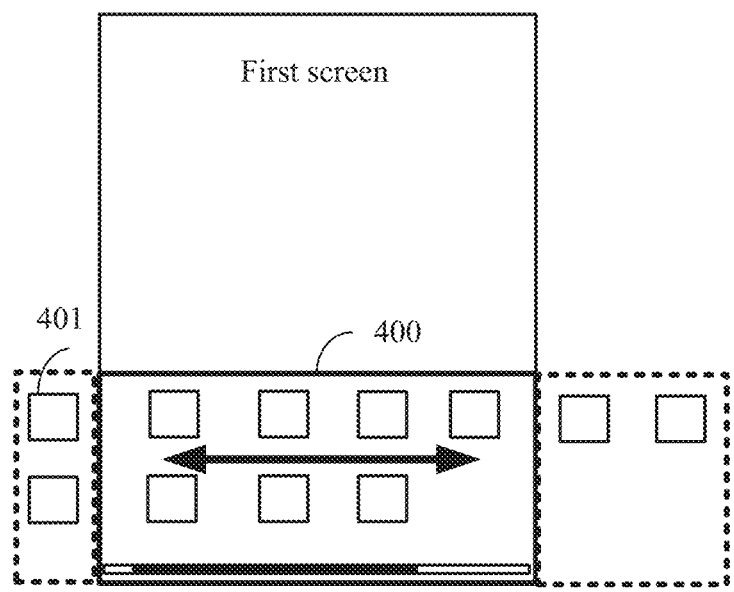
Figure 4D:
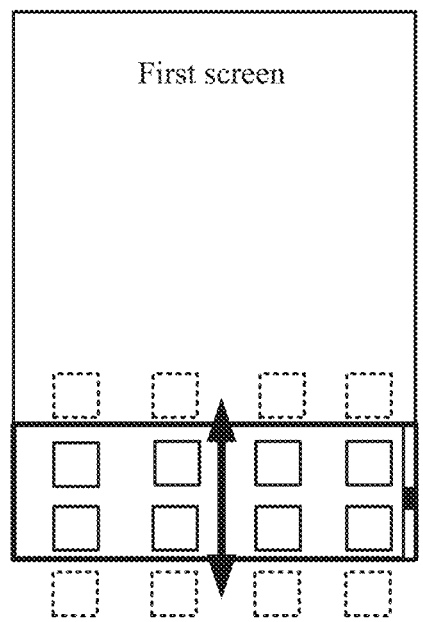

For example, the terminal displays the shortcut window on the first screen in a manner shown in FIG. 4a. In FIG. 4a, 400 is used to represent the shortcut window, and 401 is used to represent an object. Specifically, a maximum quantity of objects that can be set in the 400 may be set according to different requirements. As shown in FIG. 4a, a maximum of four objects may set in each row of the shortcut window 400, and a maximum of eight objects car be displayed on a page. That is, when a display area of the shortcut window can display a maximum of eight objects, and when a quantity of objects that are set is greater than 8, as shown in FIG. 4b, the objects may be set by using two pages, and different pages may be switched by flicking leftward and rightward. As shown in FIG. 4b, the terminal may switch to a page of a broken line box by flicking leftward. In addition, as shown in FIG. 4c, objects in the shortcut window are displaced by flicking leftward and rightward. Alternatively, as shown in the lower part of FIG. 4d, objects in the shortcut window are displayed by flicking up and down. A progress bar in the lower part of FIG. 4c and a progress bar on the right side of FIG. 4d are used to represent locations of currently displayed objects in all objects that are set in the shortcut window.

In this embodiment of the present invention, a manner in which an object that can be displayed in the shortcut window is adjusted is not limited to a type of an element associated with the object induced in the shortcut window. For example, when the object included in the shortcut window is associated with only an installed application, the object that can be displayed in the shortcut window may also be adjusted according to the manner in this embodiment of the present invention.

Figure 4E:
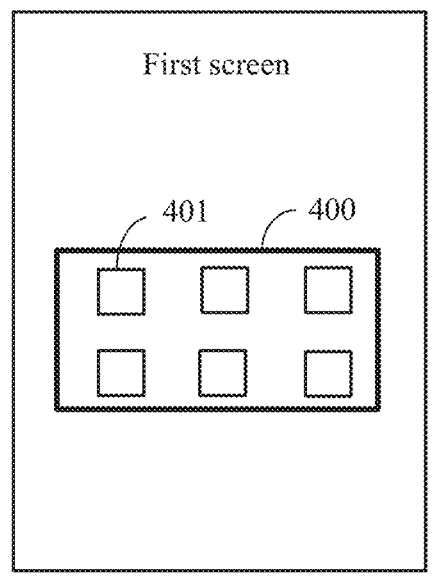
Figure 4F:
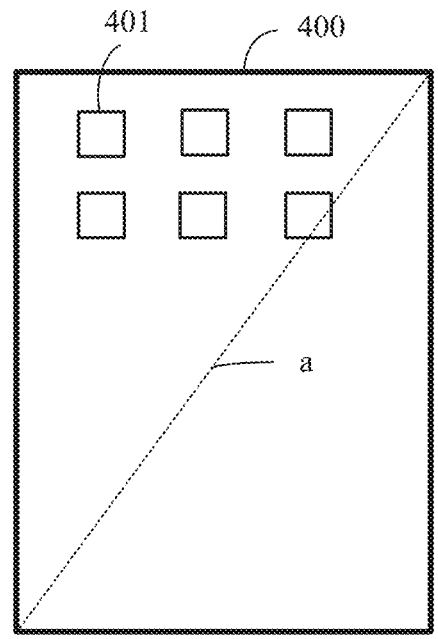

In this embodiment of the present invention, a size of the shortcut window and a location of the shortcut window in the display area are not limited. As shown in FIG. 4e, the shortcut window is in the center of the display area. The shortcut window shown in FIG. 4f is displayed in a full screen.

Figure 4G:
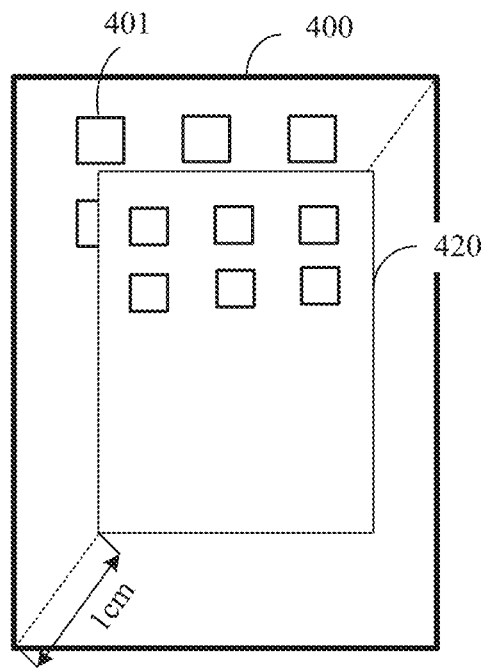
Figure 4H:
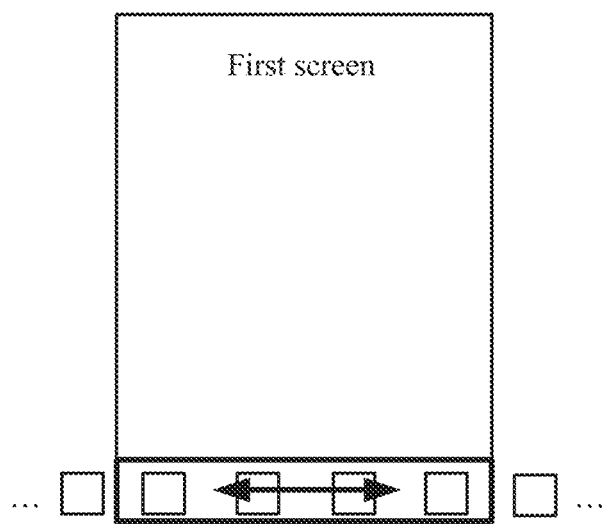

When the first screen is the desktop, the shortcut window may further be displayed in a Dock region of the desktop. As shown in FIG. 4h, objects displayed in the shortcut window are changed by flicking leftward and rightward.

Optionally, to avoid that a quantity of objects in the shortcut window is excessively large, a maximum quantity of objects that can be set in the shortcut window may be preset.

In addition, the terminal may adjust the size of the shortcut window according to a third triggering event triggered by the user. Specifically, after displaying the shortcut window, the terminal detects the third triggering event, responds to the third triggering event, and adjusts the size of the shortcut window, where the third triggering event is used to adjust the size of the shortcut window. The third triggering event may be an operation, for example, a flicking operation. For example, an initial size of the shortcut window is shown in FIG. 4f, and the size of the shortcut window is adjusted, through the operation triggered by the user, as what is shown in FIG. 4e. A diagonal a that is of the shortcut window and that is shown in FIG. 4f is used as an example, if an operation triggered by the user is simultaneously approaching from two ends of the diagonal a to a center, a length and a width of the shortcut window are scaled down at the same time. Specifically, when the user simultaneously slides from the two ends of the diagonal a to the center for 1 cm and stops, as shown in FIG. 4g, the shortcut window 400 is scaled down as a shortcut window 420. Objects may be scaled down according to a same percentage, or sizes of the objects remain unchanged. When the shortcut window is smaller, a quantity of objects in a row may be reduced. For example, three objects are initially displayed in a row, and one or two objects are displayed in a row after the shortcut window is scaled down. In addition, a size of the shortcut window in a horizontal or vertical direction may further be directly scaled down.

Optionally, in this embodiment of the present invention, when the shortcut window is not in a full screen, the location of the shortcut window may be moved according to the operation triggered by the user. Specifically, the operation may be a flicking operation in a specific region of the shortcut window. For example, the flicking operation is flicking of a finger from left to right, and the shortcut window moves rightward. Specifically, the shortcut window may move based on an actual horizontal movement distance, that is, the shortcut window moves with flicking of the finger. When the shortcut window moves out of the display area of the terminal, a part of the shortcut window moving out of the display area of the terminal is hidden. After the shortcut window moves out of the display area of the terminal, the finger continues flicking to hide the shortcut window. In addition, in a specific embodiment, the shortcut window may further move with flicking of the finger. In addition, in this embodiment of the present invention, when the shortcut window moves at the edge of the display area of the terminal, the shortcut window may not move regardless of whether the finger continues flicking to the edge at which the shortcut window moves.

Figure 5:
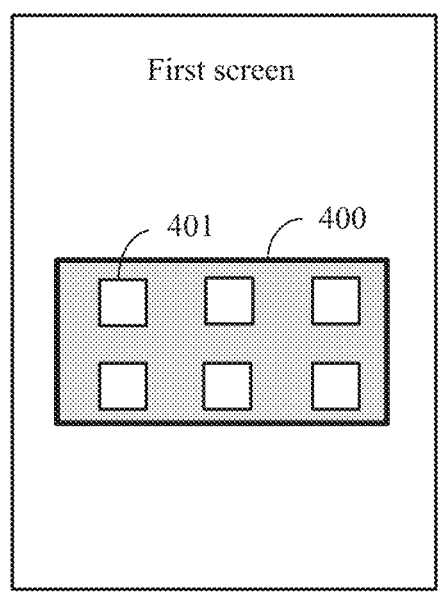
FIG. 5 is a schematic diagram of a shortcut window according to an embodiment of the present invention.

In this embodiment of the present invention, a background transparency of the shortcut window may further be adjusted. For example, in FIG. 5, a shadow area in the shortcut window 400 is the background of the shortcut window. The background transparency may be adjusted according to a requirement of the user. When the transparency is 0, the shortcut window totally covers the first screen. When the transparency is 100%, the user can see, from the background of the shortcut window, content that is in the first screen and that is in the location of the shortcut window.

In this embodiment of the present invention, adjustment of the size, location, and background transparency that are of the shortcut window are not limited to a type of an element associated with the object included in the shortcut window. For example, when the object included in the shortcut window is associated with only an installed application, the size, location, and background transparent that are of the shortcut window may also be adjusted according to the manner in this embodiment of the present invention.

Step 302: After detecting that at least one object in the shortcut window is selected, the terminal displays a screen of an element associated with the selected object.

As time goes on, a frequently-used application may be correspondingly changed with a change of a use habit of the user. To improve user experience, optionally, when the first screen is a screen of a first application, the terminal detects a second triggering event when displaying the first screen, where the second triggering event is used to trigger setting of a first object into the shortcut window, responds to the second triggering event, and sets the first object into the shortcut window, where the first object is associated with the first application.

The second triggering event may be a gesture operation irrelevant to the first screen, for example, flicking down with three fingers, or may be triggering a physical icon, by using which the user may enter a setting screen, or an operation such as a sound or a pressure.

Figure 4I:
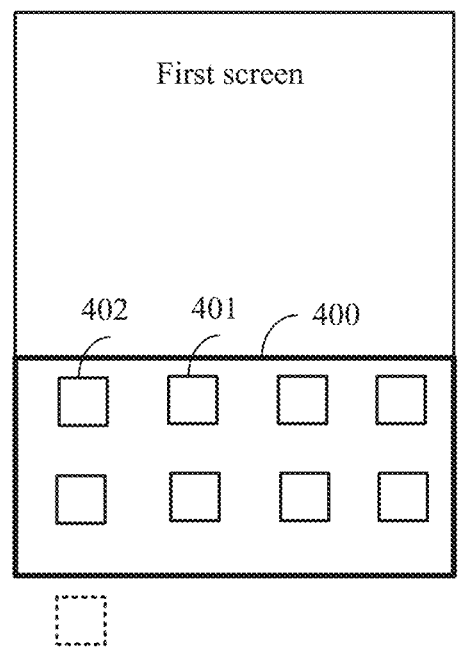

Specifically, as shown in FIG. 4a, the shortcut window 400 includes eight objects. If a maximum quantity of objects that can be set in the shortcut window is 9, the first object is directly set before an object 401. As shown in FIG. 4i, 402 is the first object. If a maximum quantity of objects that can be set in the shortcut window is 8, one of objects that meet a preset condition is deleted, and the first object is set into the shortcut window. Specifically, the preset condition may be set according to an actual condition. For example, the preset condition is an object that is selected for a smallest quantity of times in the shortcut window.

Optionally, when determining that a feature of at least one element installed on the terminal is in accordance with a preset feature, the terminal sets an object associated with the at least one element into the shortcut window.

Specifically, if the element is the application installed on the terminal, the terminal intelligently recommends, by learning a habit of using applications installed on the terminal by the user and analyzing data of applications used by the user, an application to-be-used by the user, so dial the user may quickly find an application that the user needs to use. For example, an icon of an application that meets the preset condition is set into the shortcut window in a preset time period. Specifically, if the preset feature is that a quantity of times of using the first application by the user in a specific time period is greater than a preset threshold (for example, the preset threshold is 8), when detecting a start time of the time period, the terminal sets the icon of the first application into the shortcut window. Optionally, when it comes to an ending time of the time period, the icon of the first application in the shortcut window is deleted. The preset feature may further be that an application has a new reminder or a new message. For example, if the terminal detects that a message application such as a mailbox or a message has a new reminder, an icon of the message application, such as a mailbox or a message, that has a new reminder is set into the shortcut window. In addition, the preset feature is related to an event stored in a to-be-processed event. It is assumed that the to-be-processed event includes buying a ticket, when the terminal detects that the to-be-processed event includes buying a ticket, an icon of at least one application related to a ticket in the terminal is set into the shortcut window.

If the element is a music file (for example, a file in an mp3 format), and the preset feature is that a quantity of playing times is greater than a preset quantity of times, an icon of the music file is set into the shortcut window.

It should be noted that, optionally, the terminal deletes, from the shortcut window, n objects in the at least one object at a preset time interval, where n is a positive integer that is greater than 0 and that is not greater than a total quantity of objects included in the at least one object.

Specifically, the n objects meet a preset deletion condition. It is assumed that a deletion feature is that a quantity of selection tunes of an object is less than a preset threshold, quantities of selection times of the n objects ate all less than the preset threshold. It is assumed that quantities of selection times of m objects are all less than the preset threshold, where m is greater than n, if the terminal sets that a maximum of n objects are deleted every time, the terminal successively deletes the n objects in ascending order of quantities of selection times.

It should be understood that in this embodiment of the present invention, regardless of displaying a screen of an application 1, displaying a screen of an application 2, or displaying a desktop, when detecting the first triggering event, the terminal displays the shortcut window as a shortcut window. The first triggering event may be a same operation, or may be different operations.

Alternatively, in this embodiment of the present invention, objects that are set and displayed in the shortcut window when a screen displayed on the terminal is the screen of the application 1 and the terminal detects the first triggering event on the screen of the application 1 are different from objects that are set and displayed in the shortcut window when a screen displayed on the terminal is the screen of the application 2 and the terminal detects the first triggering event on the screen of the application 2. That is, each application is corresponding to a shortcut window, and manners in which the shortcut window is invoked and displayed on screens of different applications may be the same or may be different.

Based on a same invention conception, an embodiment of the present invention further provides a terminal. A method corresponding to the terminal is the screen display method in the embodiment of the present invention. Therefore, for implementation of the terminal in this embodiment of the present invention, reference may be made to implementation of the method, and no repeated description is provided.

Figure 6:
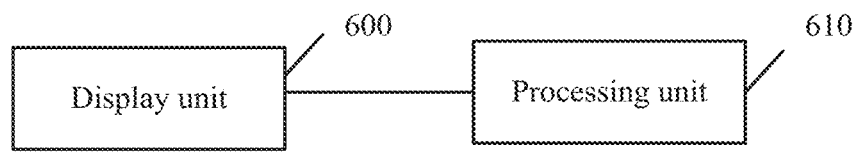
FIG. 6 is a schematic structural diagram of a terminal according to an embodiment of the present invention.

As shown in FIG. 6, a terminal in this embodiment of the present invention includes a display unit 600 and a processing unit 610, where the display unit 600 is configured to display a first screen; the processing unit 610 is configured to: when detecting a first triggering event, trigger the display unit 600 to respond to the first triggering event, where the first triggering event is used to trigger the display unit 600 to display a shortcut window on the first screen; the display unit 600 is further configured to: respond to the first triggering event, and display the shortcut window on the first screen, where the shortcut window includes at least one object, each object is associated with one element, and elements associated with the at least one object include at least two of an application installed on the terminal, contacts, settings, a reminder, or a document; and the processing unit 610 is further configured to: after detecting that at least one object in the shortcut window is selected, trigger the display unit 600 to display a screen of an element associated with the selected object.

Optionally, the first screen is a screen of a first application.

Optionally, the processing unit 610 is further configured to when displaying the first screen on the display unit 600, detect a second triggering event and respond to the second triggering event, where the second triggering event is used to trigger setting of an object associated with the first application into the shortcut window.

Optionally, the processing unit 610 is further configured to delete, from the shortcut window, n objects in the at least one object at a preset time interval, where n is a positive integer that is greater than 0 and that is not greater than a total quantity of objects included in the at least one object.

Optionally, the object is an icon of the application or a screenshot of a screen that is scaled down according to a preset percentage, that is of the application, and that is finally displayed on the terminal.

Optionally, the processing unit 610 is further configured to: after determining that a feature of at least one application installed on the terminal is in accordance with a preset feature, set an object associated with the at least one application into the shortcut window.

Optionally, the processing unit 610 is further configured to: after the display unit 600 displays the shortcut window, detect a third triggering event, where the third triggering event is used to adjust a size of the shortcut window, and respond to the third triggering event, and adjust the size of the shortcut window.

Optionally, when a quantity of objects included in the shortcut window is greater than a quantity of objects displayed in the shortcut window, the processing unit 610 is further configured to: before detecting that the al least one object in the shortcut window is selected, detect a flicking operation in a display area of the shortcut window; and respond to the flicking operation, switch between at least one object displayed in the shortcut window, and determine that objects displayed in the shortcut window include the at least one selected object.

It may be learned from the foregoing content that when displaying the first screen, the terminal detects the first triggering event and responds to the first triggering event to display the shortcut window on the first screen. The shortcut window includes at least one object, each object is associated with one element, and the elements associated with the at least one object include one or more of an application installed on the terminal, contacts, settings, a reminder, or a document. After detecting that the at least one object in the shortcut window is selected, the terminal displays the screen of the element associated with the selected object. In this embodiment of the present invention, the shortcut window can be displayed on the first screen. Therefore, the user may directly enter a screen of another application by directly invoking the shortcut window on the first screen and by using the object in the shortcut window. Compared with the prior art, this simplifies a manner of entering from the first screen to the screen of the another application, thereby improving user experience.

The present invention is described with reference to the flowcharts and/or block diagrams of the method, the device (system), and the computer program product according to the embodiments of the present invention. It should be understood that computer program instructions may be used to implement each process and/or each block in the flowcharts and or the block diagrams and a combination of a process and or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and or in one or more blocks in the block diagrams.

Although some preferred embodiments of the present invention have been described, a person skilled in the an can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A screen display method implemented by a terminal, wherein the screen display method comprises:
    displaying a first screen comprising an application;
    detecting a first triggering event, wherein the first triggering event is identifying a fingerprint;
    detecting an identity of the application displayed on the first screen;
    in response to detecting the first triggering event and the identity of the application, displaying a shortcut window as an overlay on the first screen, wherein the shortcut window comprises a set of objects, wherein the set of objects is determined based on the first triggering event and the identity of the application, wherein each object is associated with an element, wherein each element is an application installed on the terminal, a contact, a setting, a reminder, or a document, wherein the set of objects comprises a number of objects that is greater than a number of objects that can be displayed in the shortcut window at a single time, wherein the set of objects is distributed along the shortcut window, wherein only a portion of the set of objects is displayed in the shortcut window at the single time, wherein the portion of the set of objects is displayed in a horizontal line, wherein the portion of the set of objects that is displayed in the shortcut window is changed to a different portion of the set of objects in response to receiving a user gesture, wherein the user gesture comprises a leftward gesture or a rightward gesture, and wherein the portion of the set of objects is changed to display different objects in the horizontal line in response to the leftward gesture or the rightward gesture;
    detecting that at least one object in the shortcut window is selected; and
    in response to detecting that the at least one object is selected, displaying a screen of an element associated with the at least one object.

2. The screen display method of claim 1, wherein the first screen is a screen of a first application, and wherein the screen display method further comprises:
- detecting a second triggering event while displaying the first screen, wherein the second triggering event triggers setting an object associated with the first application to be included in the shortcut window; and
- in response to detecting the second triggering event, setting the object associated with the first application to be included in the shortcut window.

3. The screen display method of claim 1, further comprising deleting, from the shortcut window, a subset of the objects at a preset time interval.

4. The screen display method of claim 1, wherein the at least one object is an icon of the application.

5. The screen display method of claim 1, further comprising:
- determining that a feature of at least one application installed on the terminal satisfies a preset condition; and
- setting an object associated with the at least one application to be included in the shortcut window.

6. The screen display method of claim 1, wherein after displaying the shortcut window, the screen display method further comprises:
- detecting a third triggering event, wherein the third triggering event adjusts a size of the shortcut window; and
- responding to the third triggering event by adjusting the size of the shortcut window.

7. The screen display method of claim 1, wherein the objects are configured to be arranged in one or more rows within the shortcut window, and wherein before detecting that the at least one object in the shortcut window is selected, the screen display method further comprises:
- detecting a flicking operation within the shortcut window; and
- in response to detecting the flicking operation, displaying an updated set of objects in the shortcut window, wherein the updated set of objects includes one or more objects that are not previously displayed in the shortcut window.

8. A terminal, comprising:
- a touchscreen;
- a memory configured to store one or more programs comprising instructions; and
- a processor coupled to the touchscreen and the memory, wherein when executed by the processor, the instructions cause the terminal to be configured to:
  - display, using the touchscreen, a first screen comprising an application;
  - detect, using the touchscreen, a first triggering event, wherein the first triggering event is identifying a fingerprint;
  - detect an identity of the application displayed on the first screen;
  - trigger the touchscreen to respond to the first triggering event;
  - in response to detecting the first triggering event and the identity of the application, display a shortcut window as an overlay on the first screen, wherein the shortcut window comprises a set of objects, wherein the set of objects is determined based on the first triggering event and the identity of the application, wherein each object is associated with an element, wherein each element is an application installed on the terminal, a contact, a setting, a reminder, or a document, wherein the set of objects comprises a number of objects that is greater than a number of objects that can be displayed in the shortcut window at a single time, wherein the set of objects is distributed along the shortcut window, wherein only a portion of the set of objects is displayed in the shortcut window at the single time, wherein the portion of the set of objects is displayed in a horizontal line, wherein the portion of the set of objects that is displayed in the shortcut window is changed to a different portion of the set of objects in response to receiving a user gesture, wherein the user gesture comprises a leftward gesture or a rightward gesture, and wherein the portion of the set of objects is changed to display different objects in the horizontal line in response to the leftward gesture or the rightward gesture;
  - detect, using the touchscreen, that at least one object in the shortcut window is selected; and
  - in response to detecting that the at least one object is selected, trigger the touchscreen to display a screen of an element associated with the at least one object.

9. The terminal of claim 8, wherein the first screen is a screen of a first application, and wherein when executed by the processor, the instructions further cause the terminal to be configured to:
- detect, using the touchscreen, a second triggering event while displaying the first screen, wherein the second triggering event triggers setting an object associated with the first application to be included in the shortcut window; and
- in response to detecting the second triggering event, set the object associated with the first application to be included in the shortcut window.

10. The terminal of claim 8, wherein when executed by the processor, the instructions further cause the terminal to be configured to delete, from the shortcut window, a subset of the objects at a preset time interval.

11. The terminal of claim 8, wherein the at least one object is an icon of the application.

12. The terminal of claim 8, wherein when executed by the processor, the instructions further cause the terminal to be configured to:
- determine that a feature of at least one application installed on the terminal satisfies a preset condition; and
- set an object associated with the at least one application to be included in the shortcut window.

13. The terminal of claim 8, wherein when executed by the processor, the instructions further cause the terminal to be configured to:
- detect a third triggering event after displaying the shortcut window, wherein the third triggering event adjusts a size of the shortcut window; and
- respond to the third triggering event by adjusting the size of the shortcut window.

14. The terminal of claim 8, wherein the objects are configured to be arranged in one or more rows within the shortcut window, and wherein when executed by the processor, the instructions further cause the terminal to be configured to:
- detect a flicking operation within the shortcut window before detecting that the at least one object in the shortcut window is selected; and
- in response to detecting the flicking operation, trigger the touchscreen to display an updated set of objects in the shortcut window, wherein the updated set of objects includes one or more objects that are not previously displayed in the shortcut window.

15. The screen display method of claim 1, wherein the at least one object is a screenshot of a screen scaled down according to a preset percentage of the application installed on the terminal.

16. The terminal of claim 8, wherein the at least one object is a screenshot of a screen scaled down according to a preset percentage of the application installed on the terminal.

17. A non-transitory processor readable storage medium storing a computer program code that, when executed by a processor, causes the processor to be configured to:
- display a first screen comprising an application on a terminal;
- detect a first triggering event, wherein the first triggering event is identifying a fingerprint;
- detect an identity of the application displayed on the first screen;
- in response to detecting the first triggering event and the identity of the application, display a shortcut window as an overlay on the first screen, wherein the shortcut window comprises a set of objects, wherein the set of objects is determined based on the first triggering event and the identity of the application, wherein each object is associated with an element, wherein each element is an application installed on the terminal, a contact, a setting, a reminder, or a document, wherein the set of objects comprises a number of objects that is greater than a number of objects that can be displayed in the shortcut window at a single time, wherein the set of objects is distributed along the shortcut window, wherein only a portion of the set of objects is displayed in the shortcut window at the single time, wherein the portion of the set of objects is displayed in a horizontal line, wherein the portion of the set of objects that are displayed in the shortcut window is changed to a different portion of the set of objects in response to receiving a user gesture, wherein the user gesture comprises a leftward gesture or a rightward gesture, and wherein the portion of the set of objects is changed to display different objects in the horizontal line in response to the leftward gesture or the rightward gesture;
- detect that at least one object in the shortcut window is selected; and
- in response to detecting that the at least one object is selected, display a screen of an element associated with the at least one object.

18. The non-transitory processor readable storage medium of claim 17, wherein the first screen is a screen of a first application.

19. The screen display method of claim 1, wherein the shortcut window comprises a left portion, a center portion, and a right portion, wherein the left portion, the center portion, and the right portion comprise different objects, wherein the shortcut window changes from displaying the center portion to displaying the left portion in response to receiving a rightward user gesture, wherein the shortcut window changes from displaying the center portion to displaying the right portion in response to receiving a leftward user gesture, wherein the shortcut window is displayed along a bottom of the first screen, and wherein the first screen further comprises an indicator identifying which portion of the shortcut window is being displayed in the shortcut window.

20. The screen display method of claim 1, wherein a size of the shortcut window is configured to be increased when a user adds another object to the set of objects.

* * * * *